United States Patent [19]

Hornbostel

[11] Patent Number: 4,964,098
[45] Date of Patent: Oct. 16, 1990

[54] METHOD FOR SEISMIC TRACE INTERPOLATION

[75] Inventor: Scott C. Hornbostel, Houston, Tex.

[73] Assignee: Exxon Production Research Company, Houston, Tex.

[21] Appl. No.: 493,885

[22] Filed: Mar. 15, 1990

[51] Int. Cl.$^5$ ............................................. G01V 1/36
[52] U.S. Cl. ...................................... 367/73; 367/38; 367/62; 367/63; 364/421
[58] Field of Search ...................... 367/38, 47, 53, 59, 367/62, 63, 73; 364/421, 723

[56] References Cited

U.S. PATENT DOCUMENTS

| | | | |
|---|---|---|---|
| 3,716,829 | 2/1973 | Ruehle | 367/49 |
| 4,570,246 | 2/1986 | Herkenhoff et al. | 367/68 |
| 4,573,148 | 2/1986 | Herkenhoff et al. | 367/47 |
| 4,594,693 | 6/1986 | Pann et al. | 367/43 |
| 4,596,005 | 6/1986 | Frasier | 367/38 |
| 4,860,265 | 8/1989 | Laster et al. | 364/421 |
| 4,887,244 | 12/1989 | Willis et al. | 367/73 |
| 4,922,465 | 5/1990 | Pieprzak et al. | 367/38 |

Primary Examiner—Ian J. Lobo
Attorney, Agent, or Firm—Vaden, Eickenroht, Thompson & Boulware

[57] ABSTRACT

A method for seismic trace interpolation by dip range analysis is disclosed. In the preferred embodiment, a series of dip ranges are defined by a plurality of dips. A trace estimate for each of the dip ranges is generated by filtering with a mathematically integrated time shift in each frequency component of each seismic trace appearing in the dip range. These filtered frequency components are then passed through a low pass filter. The sum of the filtered frequency components is the trace estimate. The seismic traces are then demodulated to obtain the trace envelopes whose values along the above mentioned dips are examined for continuity. A continuity factor is developed for each dip and then each of the continuity factors is summed and the sum divided by the number of continuity factors to obtain a weighting function. The weighting functions are multiplied with the trace estimates, and the results summed to obtain the interpolated trace.

5 Claims, 3 Drawing Sheets

METHOD FOR SEISMIC TRACE INTERPOLATION

BACKGROUND OF THE INVENTION

1. Field of the Invention

This invention pertains to interpolation of seismic data from a plurality of recorded seismic traces and more specifically by performing a dip range analysis on a plurality of seismic traces and by examining the trace envelope of the seismic traces.

2. Description of the Prior Art

In interpreting or processing data recorded in seismic traces it is desirable that the traces be evenly spaced and sufficiently close together. The practice of seismic surveying techniques nevertheless encounters various obstacles that prevent this and thereby necessitate interpolation of the missing data. Another problem often arises in that the cost of the seismic survey is directly dependent on the number of traces collected and so the receivers are frequently spaced further apart than is desirable. Intermediate traces must then be interpolated from those that are recorded.

Interpolation methods in the prior art generally attempt to estimate a new trace by connecting the troughs and peaks representing reflected arrivals in recorded traces along a dip, a dip being defined as the rate of change in the time of arrival per trace. These methods typically examine the recorded traces along a number of preselected experimental dips in order to determine the correct dip of the reflected arrivals and thereafter interpolate a reflected arrival in the new trace along the correct dip. Alternately, interpolated traces may be generated by inserting zero traces at the interpolation locations and following with an appropriate spatial filter. This alternate approach requires that the signal dips be approximately known a priori.

The prior art breaks down or is insufficient in the presence of aliasing in the recorded traces. Aliasing is defined as the condition wherein a dip is sufficiently large so that there is difficulty in correlating the peaks and troughs in successive recorded traces, typically when successive traces are greater than or equal to one-half cycle out of phase. The prior art also fails when the recorded traces exhibit a plurality of dips because of an inability to adequately separate the reflected arrivals.

It is therefore a feature of the present method to provide an improved method for the interpolation of seismic traces that will accurately interpolate seismic data in the presence or absence of aliasing.

It is a further feature of the method herein disclosed that it will interpolate from a plurality of dips in the recorded traces.

It is still a further feature that the method will interpolate properly when the signal dips are not known a priori.

SUMMARY OF THE INVENTION

The present invention performs an analysis on a plurality of dip ranges defined by a preselected number of experimental dips in a trace window of seismic traces for a given period of time. A trace estimate is first generated for each of the dip ranges by filtering each of the frequency components of each trace in the dip range by mathematically integrating a time shift in those components and then summing them. In alternative preferred embodiments, the filtered frequency components are passed through a low pass filter and/or tapered before being summed. The seismic traces are also demodulated to obtain their respective trace envelopes from which their weighting functions correlated to the continuity of the envelope amplitudes along the experimental dips are derived. The trace estimates are then multiplied with the weighting functions to obtain weighted trace estimates that are then summed to generate the interpolated trace. In an alternative preferred embodiment, the weighting functions are defined to be the normalized ratios of the square of the mean of the trace envelope values of the trace envelopes along the experimental dips to the variance of said values.

BRIEF DESCRIPTION OF THE DRAWINGS

So that the manner in which the above recited features, advantages and objects of the invention, as well as others which will become apparent, are attained and can be understood in detail, a more particular description of the invention briefly summarized above may be had by reference of the embodiments thereof illustrated in the drawings, which drawings form a part of the specification. It is to be noted, however, that the appended drawings illustrate only preferred embodiments of the invention and therefore are not to be considered limiting of its scope since the invention may admit to other equally effective embodiments.

IN THE DRAWINGS

Figure 1:
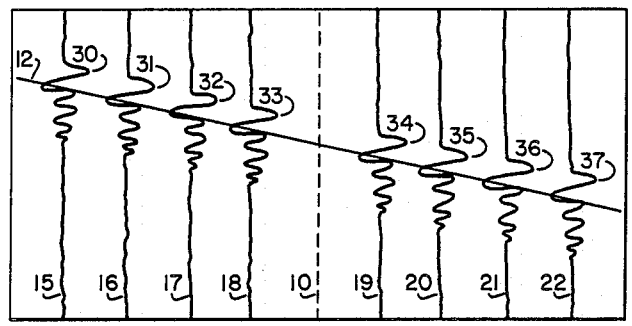

FIG. 1 illustrates the trace window containing a plurality of seismic traces among which new traces are interpolated.

Figure 2:
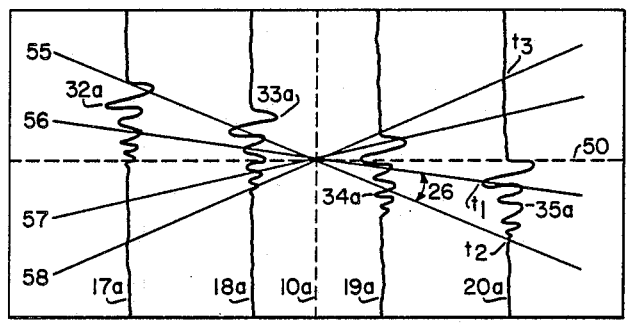

FIG. 2 is an enlarged view of a portion of the trace window in FIG. 1 illustrating the experimental dips and their corresponding dip ranges.

Figure 3:
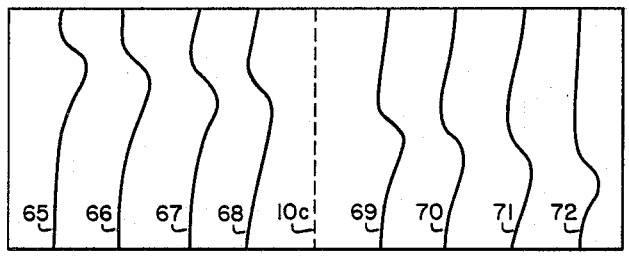

FIG. 3 illustrates the trace envelopes obtained by demodulating the seismic traces in FIG. 1.

Figure 4:
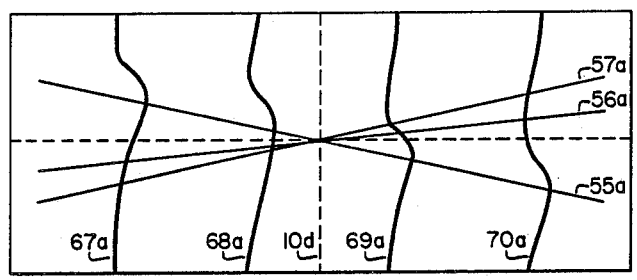

FIG. 4 illustrates the variation of the trace envelope amplitudes along the centers of the dip ranges.

Figure 5:
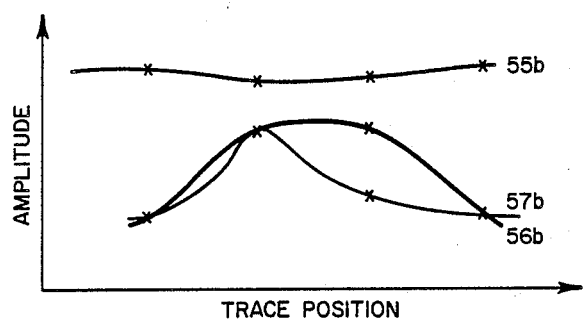

FIG. 5 is the plot of the trace envelope amplitudes in each dip range with respect to the positions of the traces in the trace window.

Figure 6:
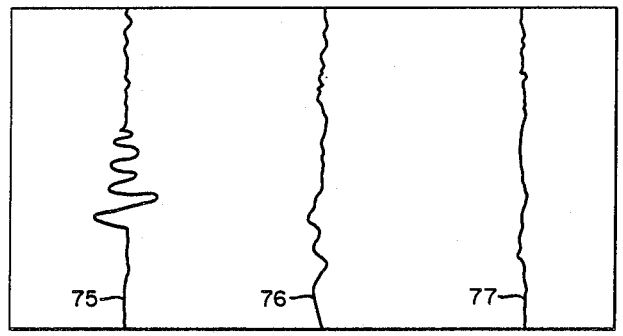

FIG. 6 depicts the trace estimates for each dip range.

Figure 7:
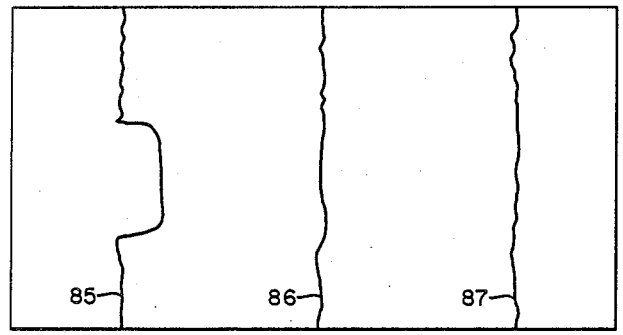

FIG. 7 illustrates the weighting functions derived from the trace envelope amplitudes along the center of the dip ranges illustrated in FIGS. 4 and 5.

Figure 8:
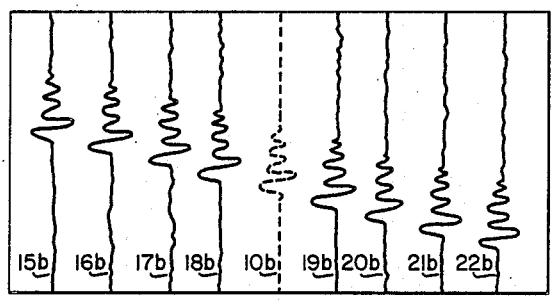

FIG. 8 illustrates the relationship of the interpolated trace as inserted among the remainder of the recorded traces in the trace window of FIG. 1.

DESCRIPTION OF THE PREFERRED EMBODIMENTS

It is well known in the art of seismic surveying that data resulting from the surveys is recorded in the form of seismic traces. The practice of seismic surveying typically employs a seismic source and a number of receivers. The source generates an energy wave and directs it toward the geological formation that reflects the energy to the receivers at or near the ground surface. The receivers detect the reflected arrivals and record them in the form of seismic traces, one trace per receiver, and then the traces are compiled to complete the survey. These techniques have also been adapted for marine environments. The practice of these techniques has long been familiar to those ordinarily skilled in the art.

FIG. 1 illustrates a trace window containing a plurality of seismic traces 15–22 generated by a seismic survey and an interpolation location 10 where it is desired to insert an interpolated trace to provide information undetected by the survey. Seismic traces 15-22 contain wavelets 30-37 that are aliased with respect to each other indicating reflected arrivals along actual dip 12. The following discussion discloses the use of the method to perform a single interpolation over a single time sample represented by the trace window. The invention may be practiced with a trace window containing varying numbers of interpolation locations, seismic traces, or dips, but the disclosure herein is narrowed for the sake of clarity. Other samples and other traces are interpolated by a single extrapolation wherein the analysis is shifted so that it is appropriately centered in another time sample. It is therefore to be understood that the practice of the invention is not to be limited to a single interpolation in a single time sample.

Moving on to FIG. 2, a portion of the trace window in FIG. 1 is illustrated in greater detail and the features in FIG. 2 having counterparts in FIG. 1 are numbered in like manner. For instance, wavelets 32a and 33a in FIG. 2 are the counterparts of wavelets 32 and 33 in FIG. 1. Each of the seismic traces 17a-20a is composed of a plurality of frequency components. A trace estimate is generated for each dip range between experimental dips 55-58 by filtering each of the frequency components of each of the seismic traces appearing in that range and then summing the filtered frequency components.

The frequency components are first filtered by mathematically integrating a time shift in the components across the time period in the trace defined by the dips in accordance with equation 1:

$$W_m(f_n) = \frac{1}{t_2 - t_1} \int_{t_1}^{t_2} e^{-i2\pi f_n \tau} d\tau \qquad (1)$$

wherein $W_m(f_n)$ = the time shift filtering function for each frequency component, n = the index of the particular frequency component being filtered, m = the index of the trace that the frequency component is a component of, $t_1$ = the lower time unit of the trace in the dip range, and $t_2$ = the upper time limit of the trace in the dip range.

By way of illustration, a weighted trace estimate for dip range 26 defined by experimental dips 55 and 56 is begun by filtering each frequency component of trace 20a with Eq.(1) where m=20a and $t_1$ and $t_2$ are the limits of the dip range. This process is then performed for each frequency component of seismic traces 17a-19a found in dip range 26. Each of these filtered frequency components is then summed to obtain the trace estimate. This is repeated for each of the dip ranges defined by experimental dips 55-58. Thus, for X number of experimental dips, Z−1 dip range analyses are performed on the seismic traces in the trace window generating X−1 trace estimates, each of which trace estimates may be mathematically represented as:

$$T(f_n) = \sum_{m=1}^{i} W_m(f_n) S_m(f_n) \qquad (2)$$

wherein $T(f_n)$ = the trace estimate of the current dip range at frequency $f_n$ $W_m(f_n)$ = Equation 1

$S_m(f_n)$ = the frequency domain representation of the input trace m at frequency $f_n$ m = index of the trace whose frequency components are being filtered, n = index of the frequencies component being filtered, i = the total number of traces in the dip range, and where Eq.(2) is applied to each $f_n$ in the bandwidth.

It is well known in the art that the integrand of Eq. 1 is a filter which will generate a constant time shift, and the prior art employs it, for example, to shift a particular point in the seismic trace, i.e., $t_1$ or $t_2$, to a selected reference point 50. The method disclosed herein has achieved superior results by shifting the group of points on the recorded trace 20a in the dip range between $t_1$ and $t_2$ to the selected reference point 50 as heretofore described.

The present method will achieve results which are more cosmetically desirable if Eq. 1 is modified to include a tapering function which is applied in the outside (i.e, minimum and maximum dip ranges:

$$W_m(f_n) = \frac{1}{t_3 - t_2} \int_{t_2}^{t_3} R(\tau) e^{-i2\pi f_n \tau} d\tau \qquad (3)$$

Wherein:

$$R(\tau) = \tfrac{1}{2} + \tfrac{1}{2} \cos \frac{\pi(\tau - t_2)}{(t_3 - t_2)} \qquad (4)$$

The use of the tapering function is optional to the implementation of the method but does facilitate the interpretation of the data set after the method has been practiced. Tapering functions are well known in the art and there are many other such functions which would produce satisfactory results. It is therefore noted that the practice of the method herein described is not to be limited to the use of Eq. (4) but may encompass any other tapering function which will yield desirable results.

The traces depicted in FIG. 1 are then demodulated as is well known in the art to obtain the trace envelopes depicted in FIG. 3. Trace envelopes 65-72 in FIG. 3 correspond to seismic traces 15-22 in FIG. 1, respectively. Also, interpolation position 10c in FIG. 3 corresponds to interpolation position 10 in FIG. 1. The trace envelopes may be generated either before or after the construction of the trace estimates heretofore described as long as both steps are performed before the trace estimates are weighted as will hereinafter be discussed. The trace envelopes are then analyzed for continuity in amplitude in the dip ranges as is illustrated in FIGS. 4 and 5.

FIG. 4 is an enlarged view of selected trace envelopes in FIG. 3 with dips 55a-57a corresponding to the centers of the dip ranges defined by experimental dips 55-58 of FIG. 2. Dip 55a is centered in the dip range defined by experimental dips 55 and 56, dip 56a in the dip range defined experimental dips 56 and 57, and dip 57a is in the dip range defined by experimental dips 57 and 58. Trace envelopes 67a-70a and interpolation position 10d correspond to trace envelopes 67-70 and interpolation position 10c in FIG. 3, respectively. FIG. 5 plots the trace envelope amplitudes in each dip range along dips 55a-57a as a function of each trace envelope's position in the trace window. Plots 55b–57b are the graphical representations for dips 55a–57a, respectively. The analysis in FIGS. 4 and 5 could alternatively be performed either by substituting experimental dips 55–58 for dips 55a–57a or by a dip range analysis as was employed for generating the trace estimates.

As can be seen in FIG. 5, the amplitude of the traces along dip 55a is fairly large and continuous while those along dips 56a and 57a are not. Continuity in amplitude indicates that the dip range being examined corresponds to an actual dip in data represented by the recorded seismic traces 15–22 of the trace window depicted in FIG. 1. The lack of continuity in plots 56b and 57b likewise indicates that those experimental dips do not correspond to actual dips in the data. The continuity in the preferred embodiments is measured by a continuity factor defined to be the ratio of the mean squared to the variance of the trace envelope amplitude values along the experimental dip, or:

$$C = \mu^2/\sigma^2 \qquad (5)$$

Wherein
c = continuity of the absolute values of the trace envelope amplitudes along the experimental dip.
$\mu$ = the mean of the trace envelope values, and
$\sigma^2$ = variance of the trace envelope values.

It is to be understood that any one of a number of other continuity factors may be used in place of Eq. (5) to obtain acceptable results. Another factor which might be taken into account in developing a continuity factor is whether a reflector in the geological formation is particularly strong and continuous. If so, its dip weights can be spread above and below the reflector to encourage the same dips at nearby times.

The continuity factors are then normalized by summing them and then dividing them by the total number of continuity factors to generate the weighting functions pictured in FIG. 7. For instance, weighting functions 85–87, one for each of the experimental dips 55a–57a, will be generated for the seismic trace 20a in dip range 26 of FIG. 2. Trace estimates 75–77 of FIG. 6 likewise correspond to the dip ranges defined by experimental dips 55–58 of a single trace such as 20a in FIG. 2. The weighting functions in FIG. 7 are then multiplied with the trace estimates in FIG. 6 so that each of the trace estimates for each of the experimental dips is weighted. These weighted trace estimates are then summed, the result being the interpolated trace which is inserted into the seismic data at the desired interpolation location as is indicated by the interpolated trace 10b in FIG. 8.

While a particular embodiment of the invention has been shown and this preferred embodiment and alternatives have been described, it will be understood that the invention is not limited thereto. Many modifications may be made, which will become apparent to those skilled in the art.

What is claimed is:

1. A method for interpolating seismic data, which comprises,
    establishing a trace window containing a plurality of seismic traces over a period of time,
    selecting a plurality of dips defining a plurality of dip ranges within said trace window,
    generating a trace estimate for each of said dip ranges, comprising the steps of,
        filtering each one of a plurality of frequency components of said seismic traces by mathematically integrating a time shift in said frequency components across said dip ranges, and
        summing said filtered frequency components,
    demodulating each of said seismic traces to obtain respective trace envelopes,
    generating a weighting function for each of said dips corresponding to the correctness of said dip,
    weighting each of said trace estimates with the weighting function of said trace estimate's respective dip, and
    summing said weighted trace estimates to generate an interpolated trace.

2. The method of claim 1 wherein said step of generating a trace estimate includes filtering said filtered frequency components with a low-pass filter before summing said filtered frequency components.

3. The method of claim 1 or claim 2 wherein said filtered frequency components are tapered.

4. The method of claim 1 or claim 2 wherein said interpolation will yield a plurality of correct weighted trace estimates for a plurality of traces in a plurality of trace windows.

5. The method of claim 1 or claim 4 wherein the weighting function is defined to be the ratio of the square of the mean of the values of said trace envelopes along said dip to the variance of said values.

* * * * *